United States Patent
Baughman et al.

(10) Patent No.: US 11,151,464 B2
(45) Date of Patent: Oct. 19, 2021

(54) FORECASTING DATA BASED ON HIDDEN CYCLE EVIDENCE

(71) Applicant: International Business Machines Corporation, Armonk, NY (US)

(72) Inventors: Aaron K. Baughman, Silver Spring, MD (US); Mauro Marzorati, Lutz, FL (US); Ashok K. Panda, Banaglore (IN); Ashish K. Tanuku, Lucas, TX (US)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 15/861,103

(22) Filed: Jan. 3, 2018

(65) Prior Publication Data

US 2019/0205775 A1     Jul. 4, 2019

(51) Int. Cl.
| | | |
|---|---|---|
| *G06N 3/00* | (2006.01) | |
| *G06N 5/04* | (2006.01) | |
| *G06F 17/14* | (2006.01) | |
| *G06F 16/9038* | (2019.01) | |
| *G06F 16/9535* | (2019.01) | |
| *G06K 9/00* | (2006.01) | |
| *G06F 16/9032* | (2019.01) | |

(52) U.S. Cl.
CPC ......... *G06N 5/041* (2013.01); *G06F 16/9038* (2019.01); *G06F 16/90332* (2019.01); *G06F 16/9535* (2019.01); *G06F 17/141* (2013.01); *G06K 9/00* (2013.01); *G06N 3/006* (2013.01)

(58) Field of Classification Search
None
See application file for complete search history.

(56) References Cited

U.S. PATENT DOCUMENTS

| | | |
|---|---|---|
| 5,519,608 A | 5/1996 | Kupiec |
| 7,185,065 B1 | 2/2007 | Holtzman et al. |
| 9,002,892 B2 | 4/2015 | Benyamin et al. |
| 9,646,264 B2 | 5/2017 | Baughman et al. |
| 2014/0006012 A1 | 1/2014 | Zhou et al. |
| 2015/0347920 A1 | 12/2015 | Medlock et al. |
| 2016/0180217 A1 | 6/2016 | Boston et al. |
| 2016/0247069 A1 | 8/2016 | Baughman et al. |
| 2017/0060991 A1 | 3/2017 | Zhang et al. |
| 2019/0102458 A1* | 4/2019 | Roblek ................ G06F 16/683 |

(Continued)

FOREIGN PATENT DOCUMENTS

WO      0101231 A1     1/2001

OTHER PUBLICATIONS

Fumi, Andrea, et al. "Fourier analysis for demand forecasting in a fashion company." International Journal of Engineering Business Management 5.Godište 2013 (2013): 5-30. (Year: 2013).*

(Continued)

*Primary Examiner* — Hal Schnee
(74) *Attorney, Agent, or Firm* — VanLeeuwen & VanLeeuwen; Ingrid M. Foerster

(57) ABSTRACT

An approach is provided in which an information handing system determines a hidden cycle of hidden evidence based on one of multiple signals in a frequency-based representation of source evidence. The information handling system extrapolates the hidden evidence to create a forecast data set and, in turn, utilizes the forecast data set to process a request.

15 Claims, 12 Drawing Sheets

(56) References Cited

U.S. PATENT DOCUMENTS

2019/0130032 A1* 5/2019 Donier .................. G10L 25/30

OTHER PUBLICATIONS

Din, Ghulam Mohi Ud, and Angelos K. Marnerides. "Short term power load forecasting using deep neural networks." 2017 International conference on computing, networking and communications (ICNC). IEEE, 2017. (Year: 2017).*

Lafta, Raid, et al. "A fast Fourier transform-coupled machine learning-based ensemble model for disease risk prediction using a real-life dataset." Pacific-Asia Conference on Knowledge Discovery and Data Mining. Springer, Cham, 2017. (Year: 2017).*

Carpentieri, "On Robustness of Permutations Sequencing Operators: Solving Satisfiability of Random 3—CNFs by Simple Crossover," 2011 IEEE Congress of Evolutionary Computation (CEC), New Orleans, LA, Jun. 2011, pp. 707-714.

Zwaska et al., "Cycle-to-Cycle Extraction Synchronization of the Fermilab Booster for Multiple Batch Injection to the Main Injector," Proceedings of the 2005 Particle Accelerator Conference, Knoxville, TN, May 2005, pp. 1802-1804.

"List of IBM Patents or Patent Applications Treated as Related," Letter from Leslie A. Van Leeuwen, Jan. 3, 2018, 1 page.

Baughman et al., "Hidden Cycle Evidence Booster," U.S. Appl. No. 15/370,732, filed Dec. 6, 2016, 50 pages.

\* cited by examiner

FORECASTING DATA BASED ON HIDDEN CYCLE EVIDENCE

BACKGROUND

Question answering systems typically utilize a large set of documents, referred to as corpora, to perform searches and answer questions. As part of the search and question answering process, question answering systems acquire evidence from the corpora to generate hypotheses and identify further evidence to support the hypotheses. To improve accuracy, question answering systems typically utilize domain-specific corpora that map to specific vocabularies within a specific domain.

The evidence-gathering process may discover patterns of information in the corpora, such as detecting particular word patterns over time. The patterns that are discovered, however, are typically the most apparent patterns and typically within a particular document. As a result, less-apparent patterns of evidence that spans across corpora may go undiscovered.

BRIEF SUMMARY

According to one embodiment of the present disclosure, an approach is provided in which an information handing system determines a hidden cycle of hidden evidence based on one of multiple signals in a frequency-based representation of source evidence. The information handling system extrapolates the hidden evidence to create a forecast data set and, in turn, utilizes the forecast data set to process a request.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
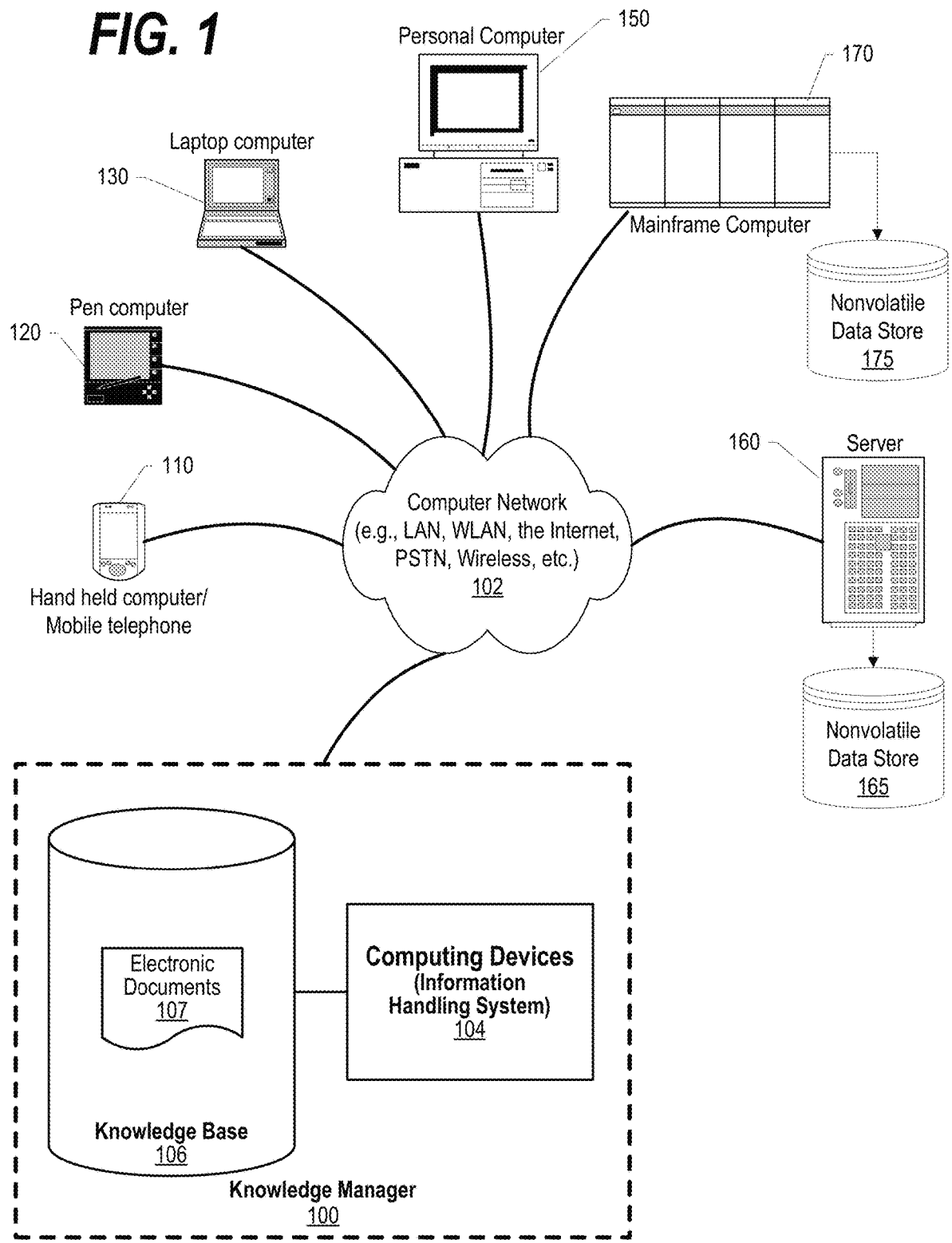
FIG. 1 depicts a schematic diagram of one illustrative embodiment of a question/answer creation (QA) system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, possible answer-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing possible answer information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 107 or other data in knowledge base 106, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with knowledge manager 100. The document 107 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
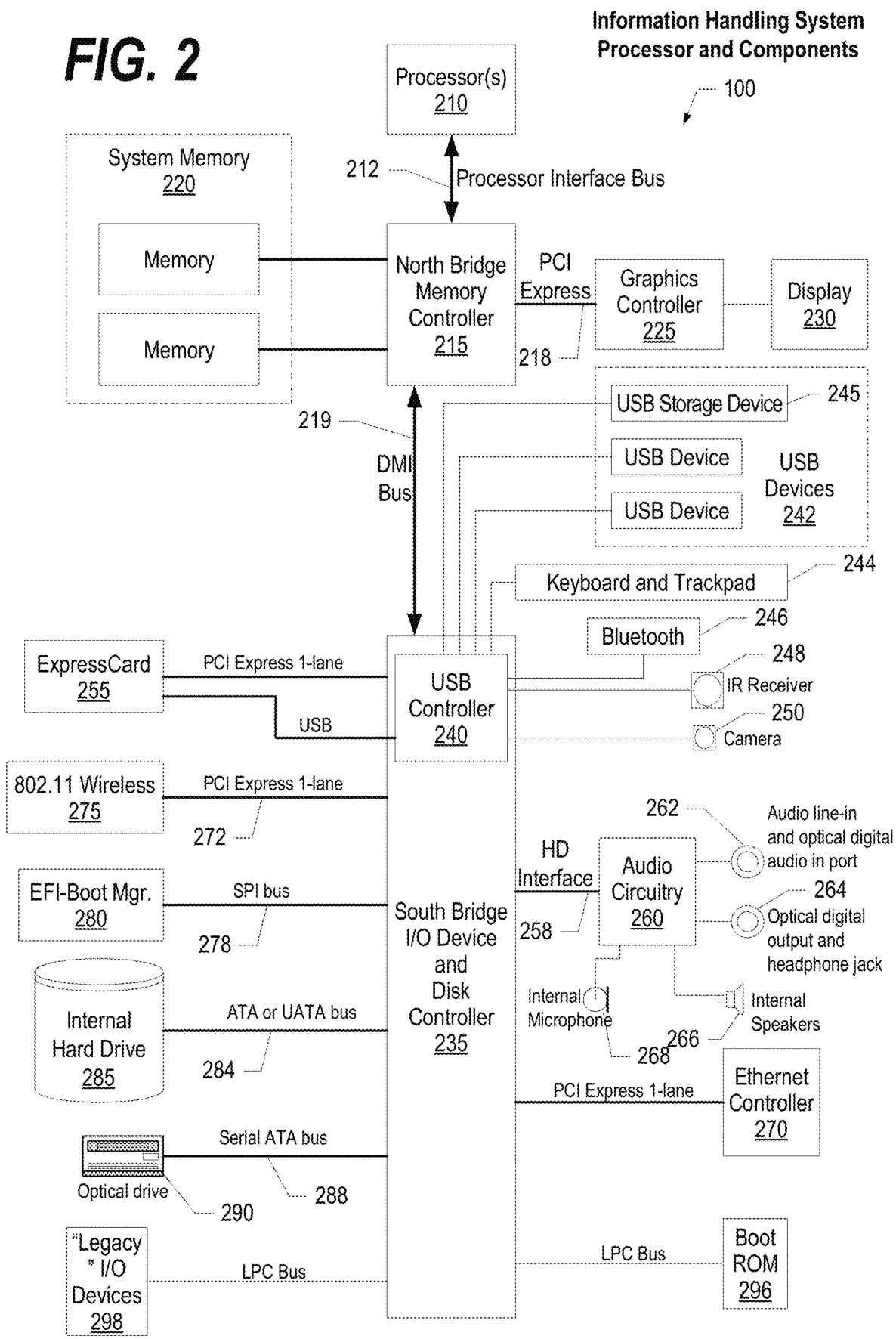
FIG. 2 illustrates an information handling system, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
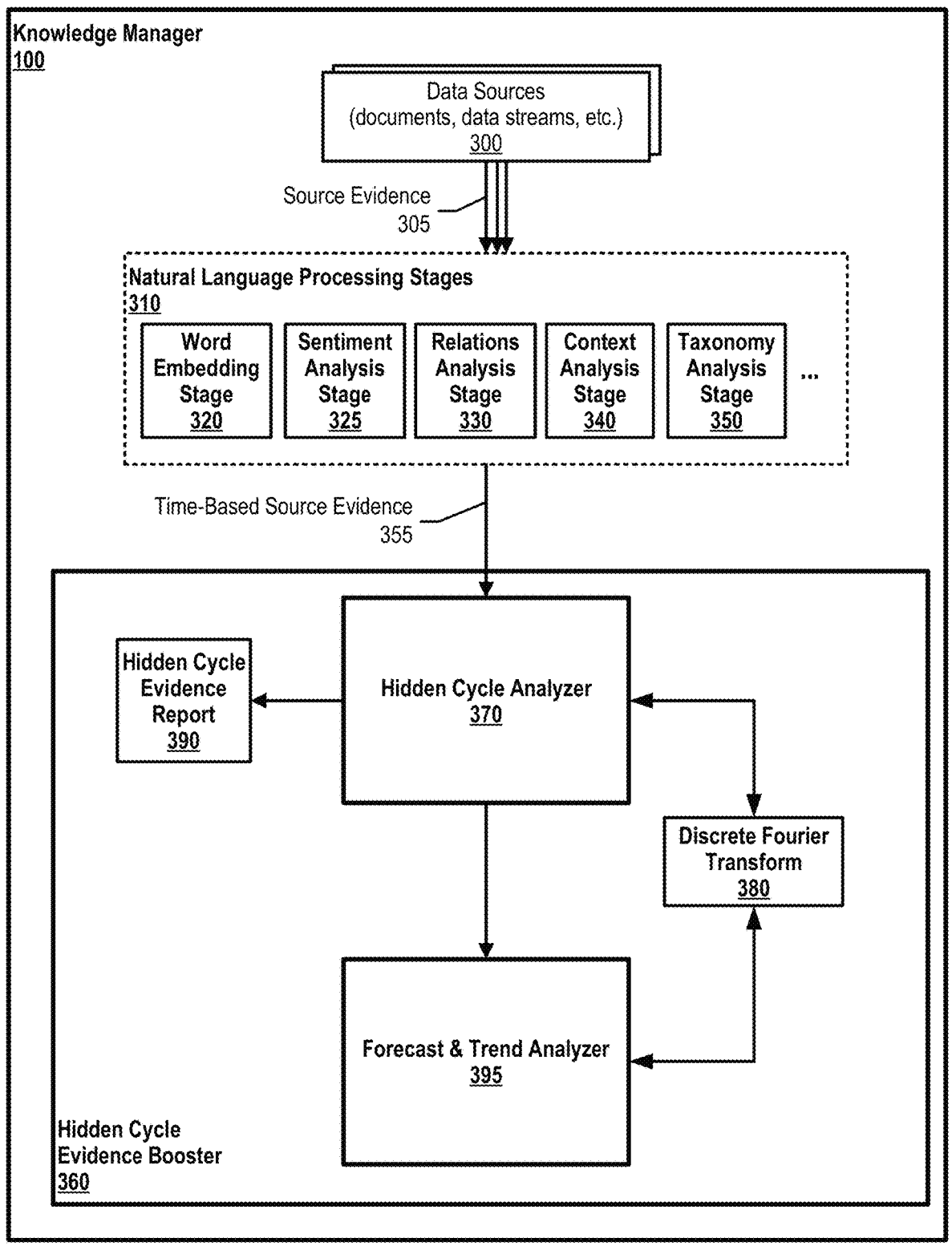
FIG. 3 is an exemplary diagram depicting a knowledge manager that uncovers hidden cycles of hidden evidence within source evidence.

FIG. 3 is an exemplary diagram depicting a knowledge manager that uncovers hidden cycles of hidden evidence within source evidence. Knowledge manager 100 includes hidden cycle evidence booster 360, which uses a transform function such as discrete Fourier transform (DFT) 380 to convert annotated time-based source evidence 355 to a frequency-based representation of the source evidence and identify hidden cycles of hidden evidence based on amplitudes of signals included in the frequency-based representation of the source evidence. Hidden cycle evidence booster 360 then utilizes the hidden cycles for forecasting and trend analysis.

Knowledge manager 100 includes natural language processing stages 310, which may include word embedding stage 320, sentiment analysis stage 325, relations analysis stage 330, context analysis stage 340, and/or taxonomy analysis stage 350. As those skilled in the art can appreciate, knowledge manager 100 may include more or less natural language processing stages than what FIG. 3 depicts.

One or more of natural language processing stages 310 receives source evidence 305 from data sources 300 and adds annotations to the data sources, which results in annotated time-based source evidence 355. For example, natural language processing stages 310 may receive newspaper articles from news feeds and add annotations that indicate positive sentiment and negative sentiment throughout the newspaper articles. Time-based source evidence 355 includes data samples that each include an annotation and a time-based component (see FIG. 4 and corresponding text for further details).

Figure 4:
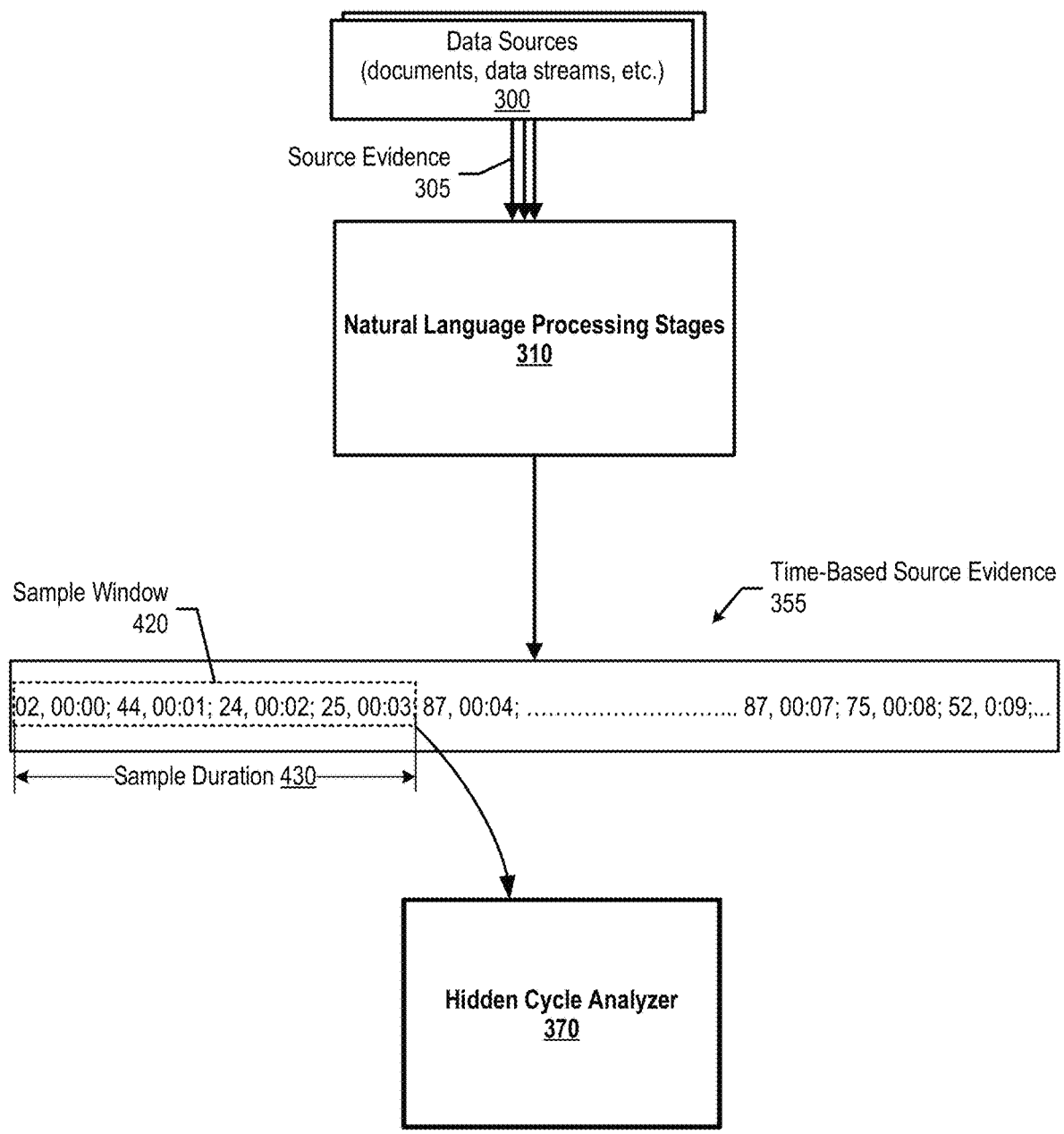
FIG. 4 is an exemplary diagram depicting a hidden cycle analyzer collecting sets of data samples from time-based source evidence based on a sample duration of a sample window.

Hidden cycle analyzer 370 sets an initial sample duration of a sample window to sample time-based source evidence 355. Referring to FIG. 4, hidden cycle analyzer 370 sets sample duration 430 of sample window 420 to an initial amount. For example, the initial sample duration may be "24 hours" to sample newspaper articles and may be based on user preferences or pre-defined settings. Hidden cycle analyzer 370 captures a set of data samples from time-based source evidence 355 and uses discrete Fourier transform 380 to transform the set of data samples to a frequency-based representation of the source evidence (see FIG. 10 and corresponding text for further details).

Hidden cycle analyzer 370 iteratively captures sets of data samples of time-based source evidence based on the sample window and converts the captured sets of data samples to frequency-based representations of the source evidence. Once hidden cycle analyzer 370 finishes capturing the sets of data samples, hidden cycle analyzer 370 identifies a signal within the frequency-based representations of the source evidence that has the largest amplitude, such as signal 1040 shown in FIG. 10.

In turn, hidden cycle analyzer 370 adjusts the sample duration of the sample window to a duration corresponding to the frequency of the signal having the largest amplitude. For example, the initial sample duration may be a 24-hour period and hidden cycle analyzer 370 changes the sample duration to a one hour period based on determining that the signal with the largest amplitude has a frequency corresponding to a one 1 hour period (See FIG. 6 and corresponding text for further details).

Hidden cycle analyzer 370 iteratively adjusts the sample window, captures sets of data samples based on the adjusted sample window, and transforms the sets of data samples to frequency-based representations of the source evidence until the frequency of the signal having the largest amplitude corresponds to the current sample duration of the sample window and no more adjustments are required. For example, the current sample duration may correspond to one hour and the frequency with the largest amplitude may also correspond to one hour. At this point, processing determines that one hour is the hidden cycle because no further analysis is required.

Once hidden cycle analyzer 370 determines the hidden cycle, hidden cycle analyzer 370 may generate hidden cycle evidence report 390 that includes hidden evidence, such as the number of positive sentiment words within the hidden cycle.

Hidden cycle analyzer 370 may also provide the hidden cycle information to forecast and trend analyzer 395. Forecast and trend analyzer 395 may then extrapolate the time-based source evidence and hidden evidence into the future based on the hidden cycle for forecasting purposes (see FIGS. 7-9, 11, and corresponding text for further details).

In one embodiment, hidden cycle evidence booster 360 compares cyclical patterns of different entities and identifies hidden cycle relationships. For example, information pertaining to road usage/congestion frequency every 24 hours may be somewhat useful by itself but, when combined with other data, such as direction of travel data and corridor location data, hidden cycles may be extracted between the different entities to better understand the data and uncover hidden patterns.

In another embodiment, hidden cycle evidence booster 360 may be valuable in cyber security such as analytics of attack modalities. Different types of attacks are performed against an IT infrastructure such as volumetric attacks, protocol attacks, application-level attacks, etc. Each attack is typically designed to target a particular vulnerability and is aimed at producing a specific result, such as denial of service, information exfiltration, installation of backdoors, money, distraction, etc. It is operationally expensive within the context of a security incident response team to be fully deployed to defend each type of attack. Instead, resources are best deployed at the instant an attack begins, which requires predictive capabilities. When hidden cycle evidence booster 360 uncovers a frequency of each specific type of attack, the hidden information can be extrapolated into the future and the security incident response team may deploy resources at the appropriate times.

FIG. 4 is an exemplary diagram depicting hidden cycle analyzer 370 collecting sets of data samples from time-based source evidence 355 based on a sample duration of a sample window. FIG. 4 shows natural language processing stages 310 receiving source evidence 305 from data sources 300, which may be located in knowledge base 106. Natural language processing stages 310 annotates source evidence 305 according to specific natural language processing stages and adds time stamps if required, which results in time-based source evidence 355. Time-based source evidence 355 includes data samples that each includes annotations and a time-based component.

Hidden cycle analyzer 370 sets an initial sample duration 430 of sample window 420, such as 10 minutes (example not to scale), and begins to sample time-based source evidence 355 in 10-minute increments. As discussed herein, hidden cycle analyzer 370 uses DFT 380 to transform the sets of data samples to frequency-based representations of the source evidence and adjusts sample duration 430 of sample window 420 based on the frequency-based representations of the source evidence (see FIG. 6 and corresponding text for further details).

Figure 5:
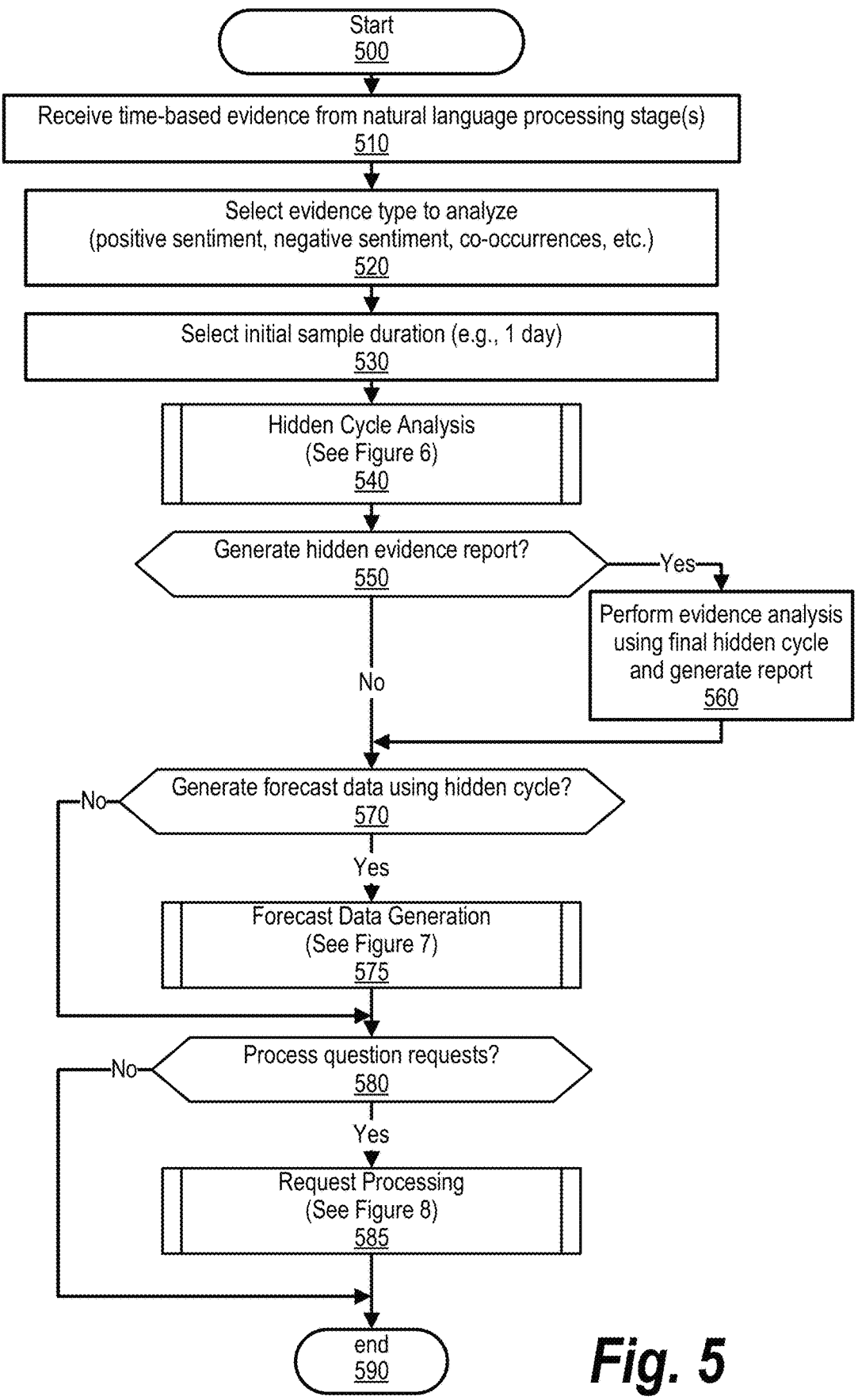
FIG. 5 is an exemplary high-level flowchart showing steps taken by an information handling system to identify hidden cycles and use the hidden cycles to extract hidden evidence and forecast future events.

FIG. 5 is an exemplary high-level flowchart showing steps taken by an information handling system to identify hidden cycles and use the hidden cycles to extract hidden evidence and forecast future events. FIG. 5 processing commences at 500 whereupon, at step 510, the process receives time-based source evidence from one or more natural language processing stages, such as a word embedding stage, a sentiment analyzer stage, etc. As discussed earlier, the time-based source evidence consists of multiple data points each having a time-based component.

At step 520, the process selects an evidence type to analyze, such as a positive sentiment type, a negative sentiment type, a relations type, a content type, a taxonomy type, etc. In one embodiment, the process selects the evidence to analyze based upon a user request, based on pre-defined parameters, or based on the time-based source evidence generated from the natural language processing stages.

At step 530, the process selects an initial sample duration to analyze the time-based source evidence. For example, the process may select "24 hours" as the initial sample duration to capture newspaper articles. At predefined process 540, the process performs hidden cycle analysis to uncover hidden cycles of hidden evidence corresponding to the selected evidence type (see FIG. 6 and corresponding text for processing details). In one embodiment, the process uncovers multiple evidence types and displays signals for the various evidence types at corresponding frequencies in a frequency-based representation of the source evidence (see FIG. 10 and corresponding text for further details).

The process determines as to whether to generate a hidden evidence report based on, in one embodiment, user preferences (decision 550). For example, the process may uncover positive sentiment words occurring every five minutes and negative sentiment words occurring every 10 minutes in a newspaper data stream. If the process should generate a hidden evidence report, then decision 550 branches to the 'yes' branch whereupon, at step 560, the process performs evidence analysis using the final hidden cycle period and generates a report.

On the other hand, if the process should not generate the hidden evidence report, then decision 550 branches to the 'no' branch, bypassing hidden evidence report generation steps.

The process determines as to whether to use the hidden cycle results to perform forecast or trend analysis (decision 570). If the process should perform forecast or trend analysis, then decision 570 branches to the 'yes' branch whereupon, at predefined process 575, the process performs steps to forecast, predict, analyze trends or monitor real-time data (see FIG. 7 and corresponding text for processing details). On the other hand, if the process should not perform forecast or trend analysis, then decision 570 branches to the 'no' branch, bypassing step 575.

The process determines as to whether to process question requests, such as historical, predictive, or real-time data analysis questions from a user (decision 580). If the process should process question requests, decision 580 branches to the 'yes' branch. At predefined process 585, the process processes performs steps to provide answers to the requested questions (see FIG. 8 and corresponding text for further details). On the other hand, if the process should not process question requests, then decision 580 branches to the 'no' branch, bypassing step 585. FIG. 5 processing thereafter ends at 590.

Figure 6:
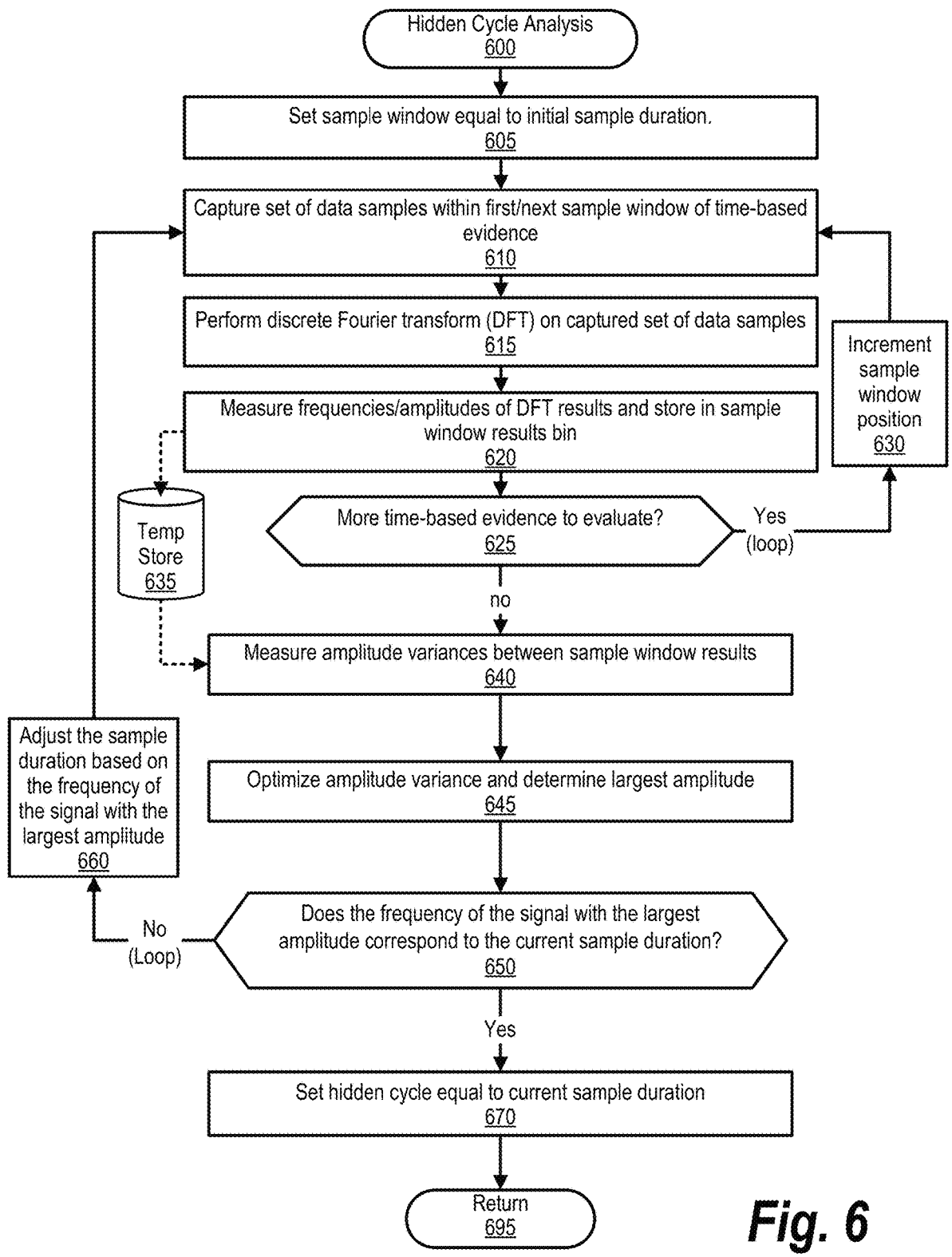
FIG. 6 is an exemplary flowchart showing steps taken by an information handling system to identify hidden cycles of hidden evidence within time-based source evidence.

FIG. 6 is an exemplary flowchart showing steps taken by an information handling system to identify hidden cycles of hidden evidence within time-based source evidence. FIG. 6 processing commences at 600 whereupon, at step 605, the process sets a sample window length equal to the initial sample duration set in step 530 in FIG. 5. At step 610, the process captures a set of data samples of the time-based source evidence that resides within the sample window. Referring to FIG. 4, sample window 420 is set at the beginning of time-based source evidence 410 and captures a set of data samples falling within sample duration 430.

Figure 10:
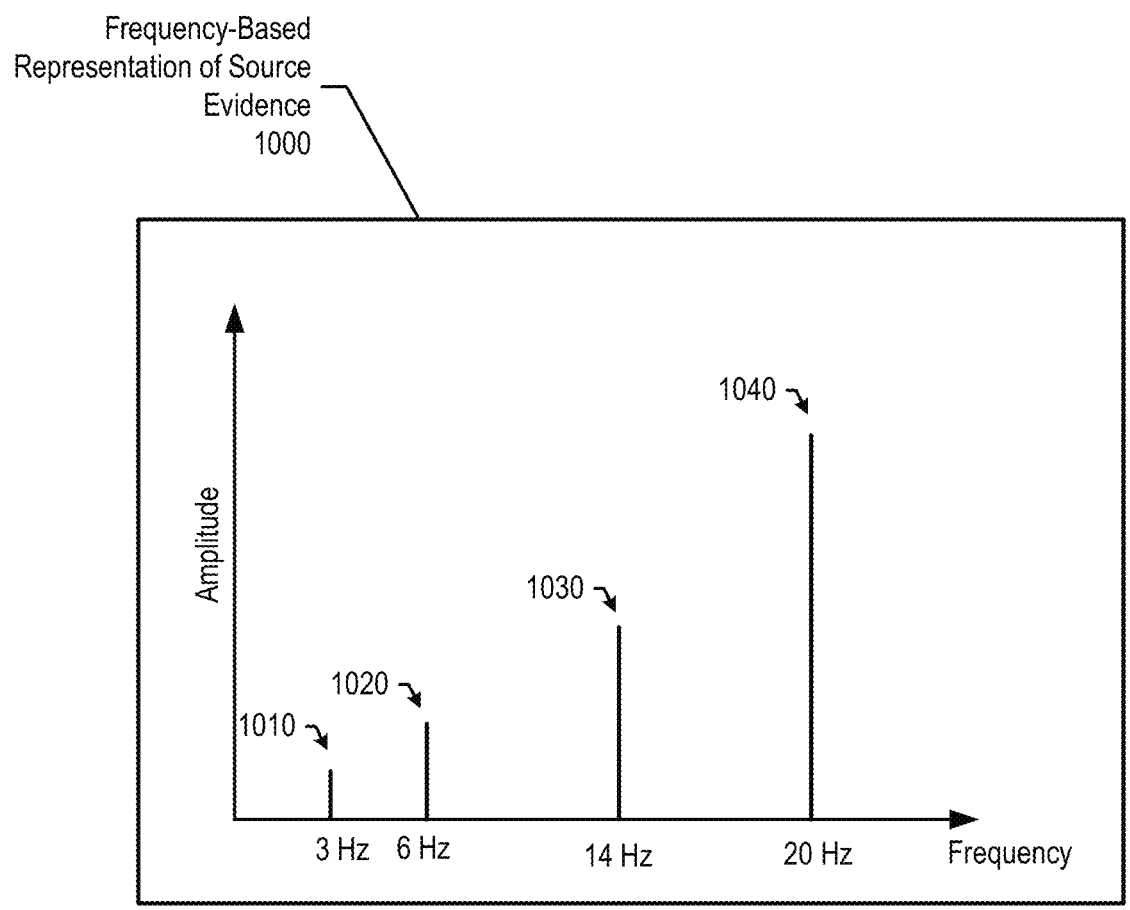
FIG. 10 is an exemplary diagram depicting a frequency-based representation of source evidence generated by a discrete Fourier transform.

At step 615, the process performs a transform function, such as a Discrete Fourier Transform (DFT), on the set of data samples to generate a frequency-based representation of the source evidence within the sample window, such as frequency-based representation of source evidence 1000 shown in FIG. 10. At step 620, the process measures the frequencies and amplitudes of the signals within the frequency-based representation and stores the frequencies and amplitudes in temporary store 635. Referring to the frequency-based representation shown in FIG. 10, the stored results may be 3 Hz, 1; 6 Hz, 2; 14 Hz, 4; 20 Hz, 8.

The process determines as to whether there is more time-based source evidence to evaluate (decision 625). If there is more time-based source evidence for which to evaluate, then decision 625 branches to the 'yes' branch which loops back to step 630, whereupon the process increments the sample window position and processes more annotated source evidence within the new sample window position. For example, referring to FIG. 4, the process moves sample window 420 to the next "slot" to capture time-based source evidence subsequent to that captured in sample duration 430. This looping continues until there is no more time-based source evidence to evaluate, at which point decision 625 branches to the 'no' branch exiting the loop.

At step 640, the process measures amplitude variances between the sample window results and, at step 645, the process optimizes the amplitude variances and determines the largest amplitude. For example, referring back to FIG. 10, 20 Hz has the highest amplitude.

The process determines as to whether the frequency of the signal with the largest amplitude corresponds to the current sample duration (decision 650). For example, the current sample duration may correspond to 1 hour and the frequency with the largest amplitude may also correspond to 1 hour. At this point, processing determines that 1 hour is the hidden cycle because no further analysis is required.

If the frequency of the signal with the largest amplitude does not correspond to the current sample duration, then decision 650 branches to the 'no' branch which loops back to step 660, whereupon the process adjusts the sample duration of the sample window based on the frequency of the signal with the largest amplitude. This looping continues until the frequency of the signal with the largest amplitude corresponds to the current sample duration, at which point decision 650 branches to the 'yes" branch exiting the loop.

At step 670, the process sets the hidden cycle equal to the current sample duration, and FIG. 6 processing thereafter returns to the calling routine (see FIG. 5) at 695.

Figure 7:
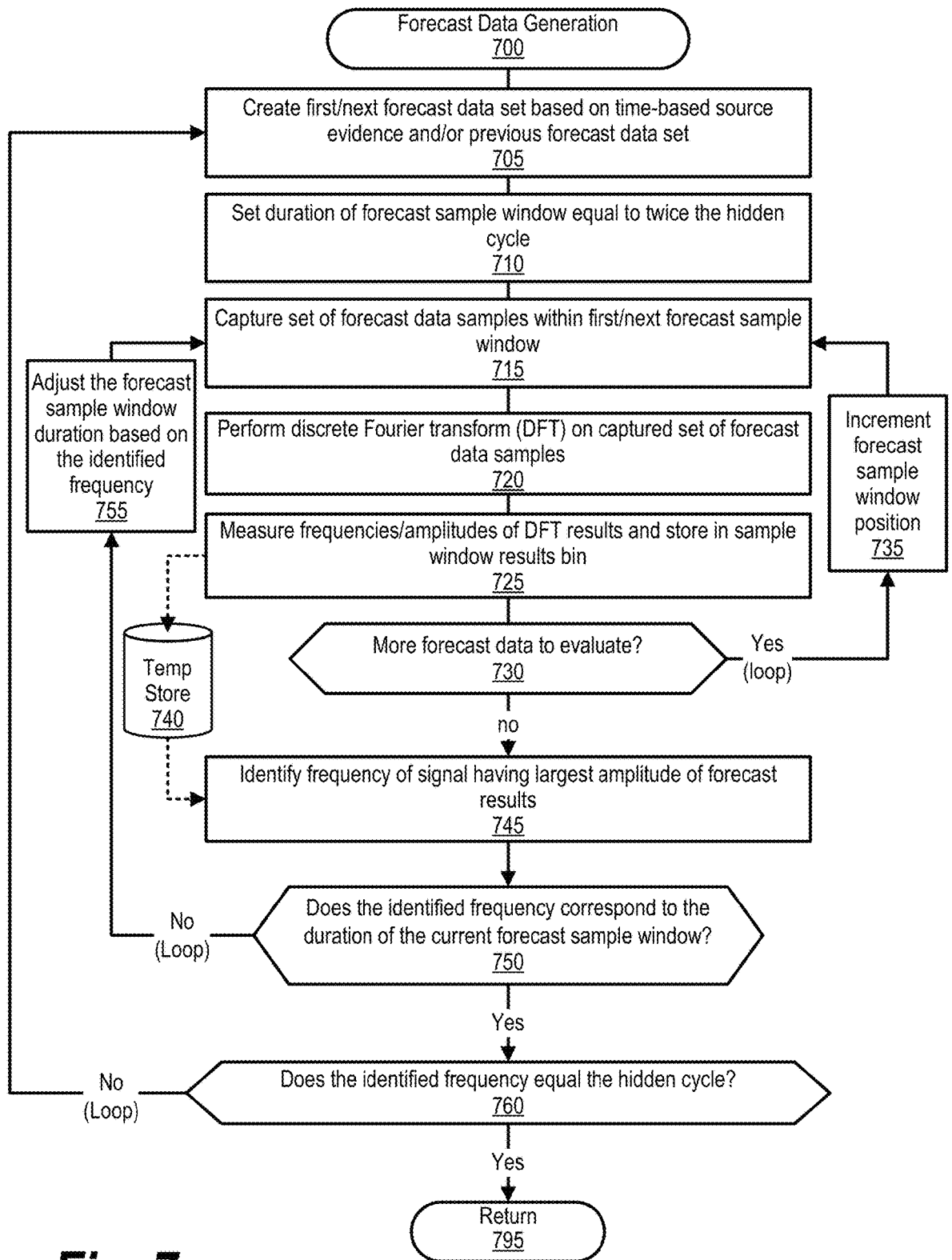
FIG. 7 is an exemplary high-level flowchart showing steps taken by an information handling system to use hidden cycles and hidden evidence to generate forecast data.

FIG. 7 is an exemplary high-level flowchart showing steps taken by an information handling system to use hidden cycles and hidden evidence to generate forecast data. FIG. 7 processing commences at 700 whereupon, at step 705, the process creates a first forecast data set based on the time-based source evidence (see FIG. 11 and corresponding text for further details). At step 710, the process sets a forecast sample window duration equal to twice the hidden cycle. The process doubles the length of the hidden cycle to account for the Nyquist rate and achieve alias-free signal sampling.

At step 715, the process captures a set of forecast data samples of the forecast data set within the forecast sample window. At step 720, the process performs a DFT on the captured forecast data sample and, at step 725, the process measures the frequencies/amplitudes of the signals in the DFT results and stores the frequencies/amplitudes in temp store 740. The process determines as to whether there is more forecast data to evaluate (decision 730). If there is more forecast data to evaluate, then decision 730 branches to the 'yes' branch which loops back to step 735, whereupon the process increments the forecast sample window position and captures/processes more sets of forecast data samples. This looping continues until there is no more forecast data to evaluate, at which point decision 730 branches to the 'no' branch exiting the loop.

At step 745, the process identifies the frequency of the signal having the largest amplitude out of the forecast results. The process then determines as to whether the identified frequency corresponds to the duration of the current forecast sample window (decision 750). If the identified frequency does not correspond to the duration of the current forecast sample window, then decision 750 branches to the 'no' branch which loops back to step 755, whereupon the process adjusts the forecast sample window duration based on the identified frequency. This looping continues until the identified frequency of the signal having the largest amplitude corresponds to the duration of the current forecast sample window, at which point decision 750 branches to the 'yes' branch exiting the loop.

The process then determines as to whether the identified frequency equals the hidden cycle (decision 760). If the identified frequency does not equal the hidden cycle, indicating that the forecast data is not in a repeating pattern, then decision 760 branches to the 'no' branch which loops back to create a next set of forecast data using the previous forecast data set (see FIG. 11 and corresponding text for further details). This looping continues until the identified frequency equals the hidden cycle, at which point decision 760 branches to the 'yes' branch existing the loop. FIG. 7 processing thereafter returns to the calling routine (see FIG. 5) at 795.

Figure 8:
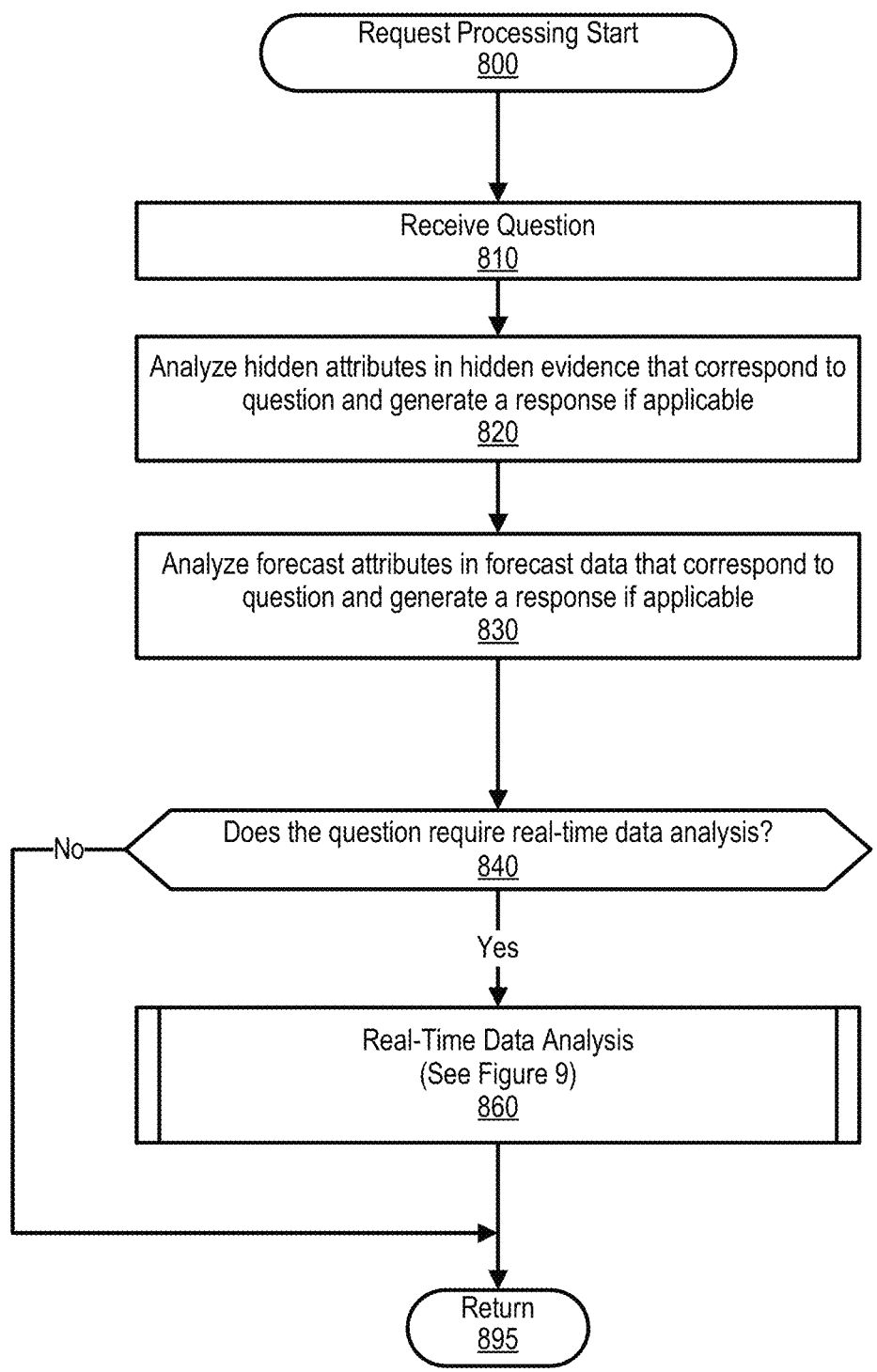
FIG. 8 is an exemplary high-level flowchart showing steps taken by an information handling system to process a request using hidden cycle information.

FIG. 8 is an exemplary high-level flowchart showing steps taken by an information handling system to process a request using hidden cycle information. FIG. 8 processing commences at 800 whereupon, at step 810, the process receives a question. For example, a question may be "Does positive social media sentiment or negative social media sentiment affect a stock price to a greater degree?"

At step 820, if the question pertains to hidden evidence, or events that have already occurred, the process analyzes hidden attributes in hidden evidence that correspond to question and generates a response. Using the example above, the process analyzes the hidden evidence relationship between positive sentiment and stock price fluctuations, as well as the hidden evidence relationship between negative sentiment and stock price fluctuations to determine which sentiment type causes the stock price to fluctuate the most and generates a response accordingly.

At step 830, if the question pertains to forecast data, the process analyzes forecast attributes in the forecast data that correspond to question. For example, if the question were "When will the stock price of company XYZ increase?," the process takes the relationship information obtained in step 820 and applies the relationship information to the forecast data. Assuming that the positive sentiment causes the stock price to increase, the process searches the forecast data for the next predicted occurrence of positive sentiment. In turn, the process generates a response based on the relationship between positive sentiment and stock price and the next predicted occurrence of positive sentiment.

The process determines as to whether the question requires real-time data analysis (decision 840). For example, the question may be "Can you inform me when the stock price should fluctuate based on social media sentiment?" If the question requires real-time data analysis, then decision 840 branches to the 'yes' branch. At predefined process 860, the process analyzes real-time data based on hidden evidence. Using the example above, the process monitors real-time social media sentiment and, when the sentiment reaches a positive sentiment with a period corresponding to the hidden cycle, the process generates a notification accordingly (see FIG. 9 and corresponding text for processing details).

On the other hand, if the question does not require real-time data analysis, then decision 840 branches to the 'no' branch bypassing pre-defined process block 860. FIG. 8 processing thereafter returns to the calling routine (see FIG. 5) at 895.

In one embodiment, hidden cycle evidence booster 360 may be used to examination a question that pertains to hidden cycle relationships, such as "How often do golf players practice to win major golf tournaments such as The Masters?" In this example, source evidence is obtained over a span of 20 hours that indicates strenuous physical activity of players where 1.0 is the maximum effort and −1.0 is resting. By analyzing historical data or a corpus of information from a player's log, the overall workout regimen of physical activity may peak four times over a 20-hour period. A count of the overall strenuous type of practice was determined every hour, and players practiced green, wood and irons at about the same gross frequency. However, after further hidden evidence cycle detection, other patterns or evidence may be discovered that supports a high winning percentage for professional golfers.

Continuing with this embodiment, the hidden evidence shows that winning golfers typically practice their long game about twice every 20 hours; practice their mid game 12 times every 20 hours; and practice green shots about 6 times every 20 hours. The most influential practice routine towards winning is the short game practice while the mid game is the least. As a result, the hidden cycles are decomposed into practice types and presented to a user as potential solutions of 41% short game, 28% mid game, and 31% long game. From this information, the information handling system could also answer a question such as "Is Tiger Woods likely to win the USGA 2017?" by comparing Tiger Woods' practice regiment against the determined most influential practice routine.

Figure 9:
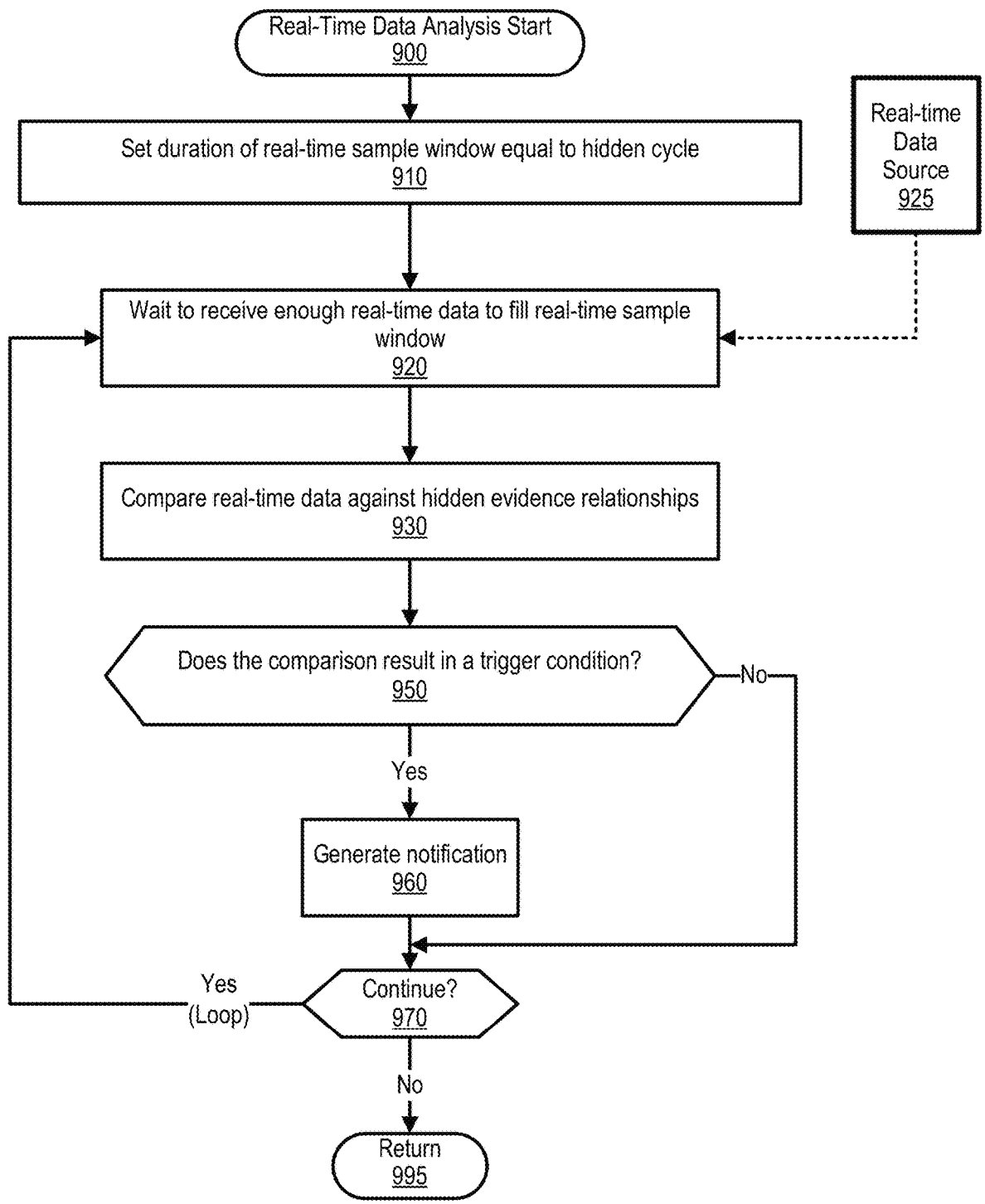
FIG. 9 is an exemplary flowchart showing steps taken by an information handling system to analyze real-time data against hidden cycle information.

FIG. 9 is an exemplary flowchart showing steps taken by an information handling system to analyze real-time data against hidden cycle information. FIG. 9 processing commences at 900 whereupon, at step 910, the process sets a duration of a real-time sample window equal to the hidden cycle. At step 920, the process waits to receive enough real-time data from real-time data source 925 to fill the real-time window length. For example, the process may gather information from a social media site and wait to gather one hour's worth of information.

At step 930, the process compares the real-time data against hidden evidence relationships, such as those determined in step 820 of FIG. 8. For example, the process may have determined that a stock price increases four hours after social media indicates positive sentiment five times within an hour. In this example, the process evaluates how many times positive sentiment occurred in the real-time social media stream data.

The process determines as to whether the comparison results in a trigger condition, such as positive sentiment occurring more than five times in an hour (decision 950). If the comparison results in a trigger condition, then decision 950 branches to the 'yes' branch whereupon, at step 960, the process generates a notification, such as "Stock XYZ predicted to increase in four hours due to social media positive sentiment occurring five times in an hour." On the other hand, if the comparison does not result in a trigger condition, then decision 950 branches to the 'no' branch bypassing step 960.

The process determines as to whether to continue analyzing real-time data (decision 970). If the process should continue, then decision 970 branches to the 'yes' branch which loops back capture and process more real-time data. This looping continues until the process should terminate, at which point decision 970 branches to the 'no' branch exiting the loop. FIG. 9 processing thereafter returns to the calling routine (see FIG. 8) at 995.

FIG. 10 is an exemplary diagram depicting a frequency-based representation of source evidence generated by a discrete Fourier transform. Frequency-based representation of source evidence 1000 shows signals 1010, 1020, 1030, and 1040. Each of the signals corresponds to evidence types that occur in the source evidence in cycles. For example, signal 1010 may correspond to negative sentiment words and signal 1040 may correspond to positive sentiment words. As such, for a given sample window, the number of positive sentiment words is larger than the number of negative sentiment words based on the amplitudes of signals 1010 and 1040.

Hidden cycle analyzer 370 evaluates frequency-based representations of the source evidence 1000 and determines that signal 1040 has the largest amplitude. In turn, hidden cycle analyzer 370 adjusts the sample duration of the sample window to correspond with 20 Hz, if the sample duration does not already correspond with 20 Hz, and resamples the time-based source data as discussed herein.

Figure 11:
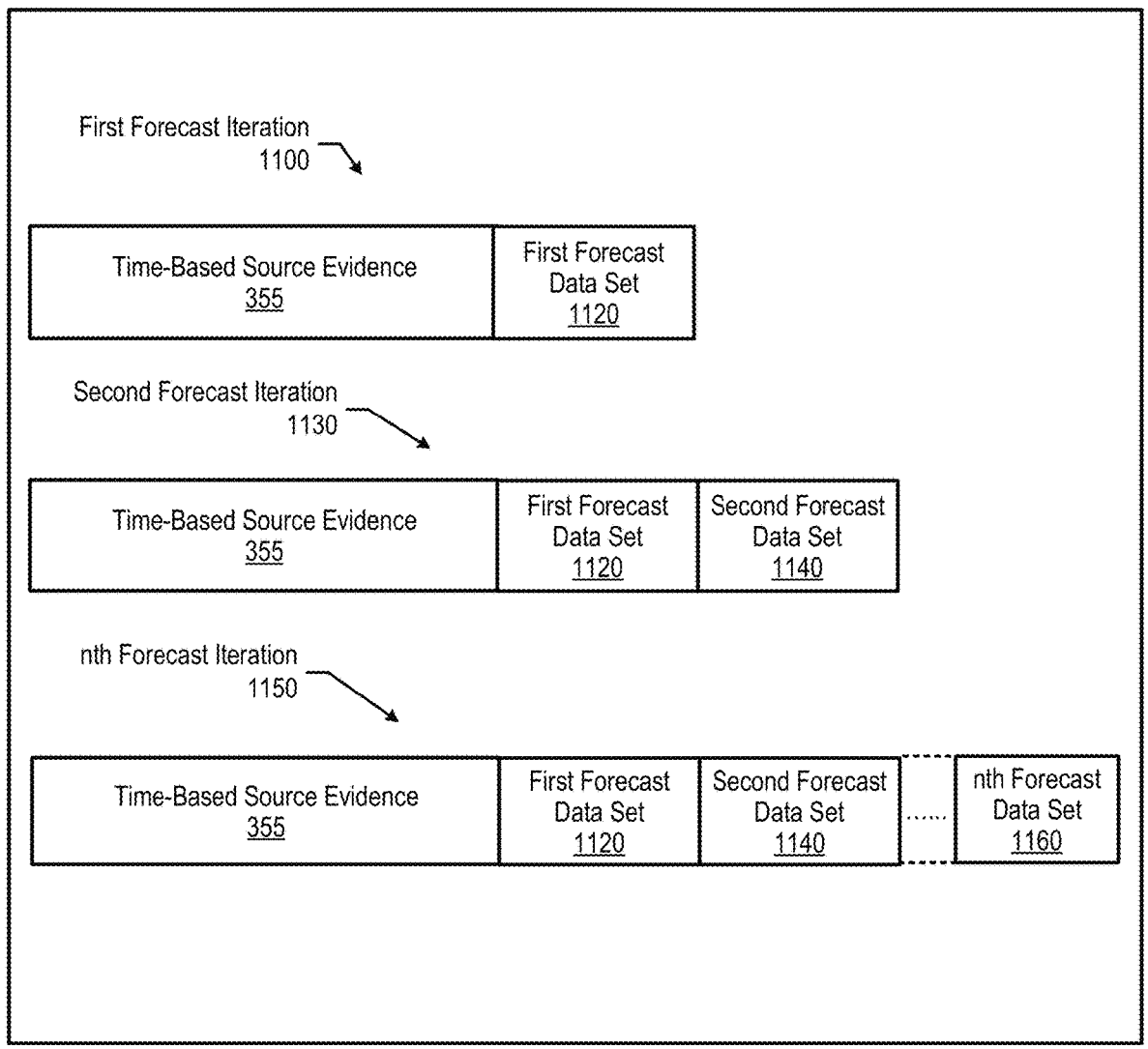
FIG. 11 is an exemplary diagram depicting forecast iterations of time-based evidence.

FIG. 11 is an exemplary diagram depicting forecast iterations of time-based evidence. Forecast and trend analyzer 395 creates iterations of forecast data sets to extrapolate hidden evidence into the future until, in one embodiment, the forecast data sets do not produce additional hidden cycles. After each iteration, forecast and trend analyzer 395 forecasts into the future to produce new data. Next, forecast and trend analyzer 395 forecasts forward by learning from the past evidence data and previously forecasted data, referred to herein as multi-tiered forecasting, to help forecast further into the future by forecasting from generated data from previous forecasts.

Forecast and trend analyzer 395 performs first forecast iteration 1100 to generate first forecast data set 1120 from time-based source evidence 355. After analyzing first forecast data set 1120, forecast and trend analyzer 395 performs second forecast iteration 1130, which appends second forecast data set 1140 to first forecast data set 1120.

After analyzing second forecast data set 1140, forecast and trend analyzer 395 may perform additional iterations (nth forecast iteration 1150) to generate additional nth forecast data sets 1160 until the additionally generated forecast data sets do not produce additional hidden cycles. Forecast and trend analyzer 395 then utilizes the forecast data sets for forecasting, predictions, and/or real-time data analysis as discussed herein.

Figure 12:
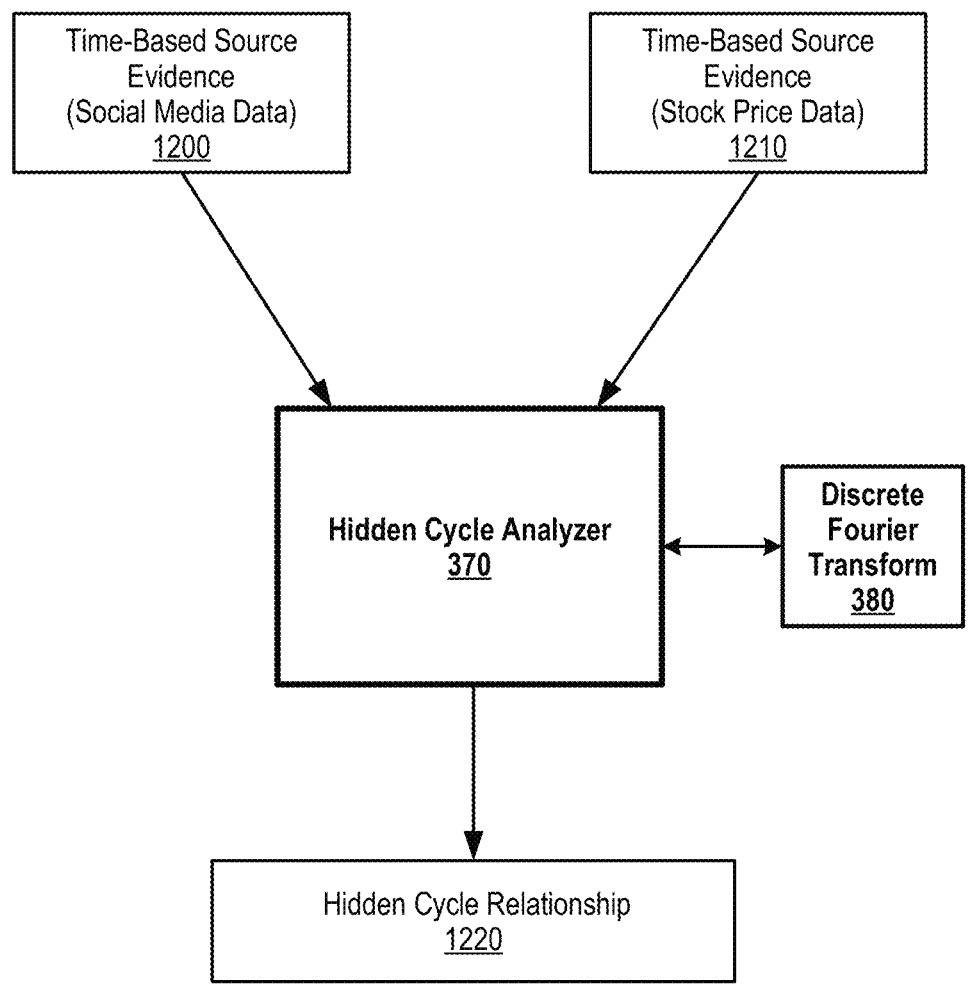
FIG. 12 is an exemplary diagram depicting a hidden cycle analyzer comparing time-based source evidence between two entities to identify hidden cycle relationships.

FIG. 12 is an exemplary diagram depicting a hidden cycle analyzer comparing time-based source evidence between two entities to identify hidden cycle relationships. The example shown in FIG. 12 shows time-based source evidence 1200 that includes social media data, and time-based source evidence 1210 that includes stock price data. In this example, social media streams may be an essential mechanism to collect thoughts, opinions, demands and feelings to form real-time public sentiment. In a stock exchange, the variation of a company's stock price may be predicted by finding the right correlation between the positive and negative public sentiment.

A traditional prediction of the stock price is on analysis of available data, which does not help live prediction about public sentiment for the stock. However, hidden cycle analyzer 370 may use time-based source evidence 1200 with reference to time-based source evidence 1210 and identify the influx of positive and negative data to find 1) the overall sentiment of people towards a stock, and 2) the velocity and acceleration of feedback on social media. The relationship between social media and a stock price may then be generated as hidden cycle relationship 1220 and utilized for subsequent predictions.

In one embodiment, hidden cycle evidence booster 360 may be used in the medical field to uncover medically-based relationships. For example, a patient may have undergone deep brain stimulation surgery to implant a pace maker under the patient's collarbone. Generally, a physician can tune the patient's pace maker to stop the patient's hand trembling if needed. However, a rate variability sensor may pick up acceleration of the patient's beating heart at the same time the patient's efficacy decreases. As the patient lives life, the patient tracks eating habits and activities while biometric sensors track thermograms, respiration, gait, and voice patterns. An overall amplitude over time signal is constructed for each signal that represents the percentage of different points each modality is from an average. Hidden cycles surface that correspond to the most important frequencies to examine each modality. As a result, the principle components of each frequency are deduced. For example, the patent may be drinking soda, eating chocolate and watching his child play soccer every morning. A cycle that was sampled once per 24 hours in the morning was the strongest and contained the drinking coke, eating chocolate and watching his child play soccer components as measured by biometrics.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   identifying a hidden cycle of hidden evidence based on one of a plurality of signals in a frequency-based representation of source evidence, wherein the hidden cycle corresponds to a frequency at which the hidden evidence is included in the source evidence;
   extrapolating the hidden evidence to create at least a first forecast data set; and
   utilizing at least the first forecast data set to process a question from a user, wherein the processing further comprises:
      identifying a hidden cycle relationship between a first data type and a second data type within the first forecast data set;
      receiving real-time data from a real-time data source;
      comparing the real-time data against the first forecast data set;
      determining that the comparison results in a trigger condition based on detecting that the real-time data corresponds to the first data type; and
      generating, based on the trigger condition, a notification that comprises an answer to the question and an indicator corresponding to the second data type.

2. The method of claim 1 further comprising:
   setting a forecast sample window duration to twice a duration of the hidden cycle;
   capturing, within the forecast sample window, a set of data samples from the first forecast data set;
   performing a discrete Fourier transform on the captured set of data samples, resulting in a plurality of different signals corresponding to a plurality of evidence types in the first forecast data set; and
   adjusting the duration of the forecast sample window based on a frequency of a selected one of the plurality of different signals, resulting in an adjusted forecast sample window.

3. The method of claim 2 wherein each of the plurality of different signals includes one of a plurality of amplitudes corresponding to a number of occurrences of its respective one of the plurality of evidence types, and wherein the selected signal has a largest amplitude out of the plurality of amplitudes.

4. The method of claim 2 further comprising:
   determining that the adjusted forecast sample window is different than the hidden cycle;
   generating a second forecast data set in response to the determining; and
   appending the second forecast data set onto the first forecast data set.

5. The method of claim 4 further comprising:
capturing, using the adjusted forecast sample window, a subsequent set of data samples from the second forecast data set;
performing a subsequent discrete Fourier transform on the subsequent set of data samples to generate a plurality of subsequent signals corresponding to the plurality of evidence types;
identifying a subsequent frequency of one of the plurality of subsequent signals having a largest amplitude;
determining whether the identified subsequent frequency corresponds to the hidden cycle; and
in response to determining that the identified subsequent frequency does not correspond to the hidden cycle, generating a third forecast data set from the second forecast data set and appending the third forecast data set onto the second forecast data set.

6. An information handling system comprising:
one or more processors;
a memory coupled to at least one of the processors; and
a set of computer program instructions stored in the memory and executed by at least one of the processors in order to perform actions of:
identifying a hidden cycle of hidden evidence based on one of a plurality of signals in a frequency-based representation of source evidence, wherein the hidden cycle corresponds to a frequency at which the hidden evidence is included in the source evidence;
extrapolating the hidden evidence to create at least a first forecast data set; and
utilizing at least the first forecast data set to process a question from a user, wherein the processing further comprises:
identifying a hidden cycle relationship between a first data type and a second data type within the first forecast data set;
receiving real-time data from a real-time data source;
comparing the real-time data against the first forecast data set;
determining that the comparison results in a trigger condition based on detecting that the real-time data corresponds to the first data type; and
generating, based on the trigger condition, a notification that comprises an answer to the question and an indicator corresponding to the second data type.

7. The information handling system of claim 6 wherein at least one of the one or more processors perform additional actions comprising:
setting a forecast sample window duration to twice a duration of the hidden cycle;
capturing, within the forecast sample window, a set of data samples from the first forecast data set;
performing a discrete Fourier transform on the captured set of data samples, resulting in a plurality of different signals corresponding to a plurality of evidence types in the first forecast data set; and
adjusting the duration of the forecast sample window based on a frequency of a selected one of the plurality of different signals, resulting in an adjusted forecast sample window.

8. The information handling system of claim 7 wherein each of the plurality of different signals includes one of a plurality of amplitudes corresponding to a number of occurrences of its respective one of the plurality of evidence types, and wherein the selected signal has a largest amplitude out of the plurality of amplitudes.

9. The information handling system of claim 7 wherein at least one of the one or more processors perform additional actions comprising:
determining that the adjusted forecast sample window is different than the hidden cycle;
generating a second forecast data set in response to the determining; and
appending the second forecast data set onto the first forecast data set.

10. The information handling system of claim 9 wherein at least one of the one or more processors perform additional actions comprising:
capturing, using the adjusted forecast sample window, a subsequent set of data samples from the second forecast data set;
performing a subsequent discrete Fourier transform on the subsequent set of data samples to generate a plurality of subsequent signals corresponding to the plurality of evidence types;
identifying a subsequent frequency of one of the plurality of subsequent signals having a largest amplitude;
determining whether the identified subsequent frequency corresponds to the hidden cycle; and
in response to determining that the identified subsequent frequency does not correspond to the hidden cycle, generating a third forecast data set from the second forecast data set and appending the third forecast data set onto the second forecast data set.

11. A computer program product stored in a computer readable storage medium, comprising computer program code that, when executed by an information handling system, causes the information handling system to perform actions comprising:
identifying a hidden cycle of hidden evidence based on one of a plurality of signals in a frequency-based representation of source evidence, wherein the hidden cycle corresponds to a frequency at which the hidden evidence is included in the source evidence;
extrapolating the hidden evidence to create at least a first forecast data set; and
utilizing at least the first forecast data set to process a question from a user, wherein the processing further comprises:
identifying a hidden cycle relationship between a first data type and a second data type within the first forecast data set;
receiving real-time data from a real-time data source;
comparing the real-time data against the first forecast data set;
determining that the comparison results in a trigger condition based on detecting that the real-time data corresponds to the first data type; and
generating, based on the trigger condition, a notification that comprises an answer to the question and an indicator corresponding to the second data type.

12. The computer program product of claim 11 wherein the information handling system performs additional actions comprising:
setting a forecast sample window duration to twice a duration of the hidden cycle;
capturing, within the forecast sample window, a set of data samples from the first forecast data set;
performing a discrete Fourier transform on the captured set of data samples, resulting in a plurality of different signals corresponding to a plurality of evidence types in the first forecast data set; and adjusting the duration of the forecast sample window based on a frequency of a selected one of the plurality of different signals, resulting in an adjusted forecast sample window.

13. The computer program product of claim 12 wherein each of the plurality of different signals includes one of a plurality of amplitudes corresponding to a number of occurrences of its respective one of the plurality of evidence types, and wherein the selected signal has a largest amplitude out of the plurality of amplitudes.

14. The computer program product of claim 12 wherein the information handling system performs additional actions comprising:
 determining that the adjusted forecast sample window is different than the hidden cycle;
 generating a second forecast data set in response to the determining; and
 appending the second forecast data set onto the first forecast data set.

15. The computer program product of claim 14 wherein the information handling system performs additional actions comprising:
 capturing, using the adjusted forecast sample window, a subsequent set of data samples from the second forecast data set;
 performing a subsequent discrete Fourier transform on the subsequent set of data samples to generate a plurality of subsequent signals corresponding to the plurality of evidence types;
 identifying a subsequent frequency of one of the plurality of subsequent signals having a largest amplitude;
 determining whether the identified subsequent frequency corresponds to the hidden cycle; and
 in response to determining that the identified subsequent frequency does not correspond to the hidden cycle, generating a third forecast data set from the second forecast data set and appending the third forecast data set onto the second forecast data set.

\* \* \* \* \*